United States Patent
Li

(10) Patent No.: US 11,960,736 B2
(45) Date of Patent: Apr. 16, 2024

(54) MEMORY CONTROLLER AND METHOD FOR CONTROLLING ACCESS TO A MEMORY MODULE

(71) Applicant: MONTAGE TECHNOLOGY CO., LTD., Shanghai (CN)

(72) Inventor: Yi Li, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 75 days.

(21) Appl. No.: 17/891,150

(22) Filed: Aug. 19, 2022

(65) Prior Publication Data
US 2023/0081310 A1 Mar. 16, 2023

(30) Foreign Application Priority Data
Aug. 24, 2021 (CN) .......................... 202110974837.6

(51) Int. Cl.
*G06F 3/06* (2006.01)
(52) U.S. Cl.
CPC .......... *G06F 3/0622* (2013.01); *G06F 3/0656* (2013.01); *G06F 3/0673* (2013.01)
(58) Field of Classification Search
CPC ..... G06F 3/0622; G06F 3/0656; G06F 3/0673
See application file for complete search history.

(56) References Cited

U.S. PATENT DOCUMENTS

| 2016/0342533 A1* | 11/2016 | Shan ..................... G06F 21/554 |
| 2018/0157822 A1* | 6/2018 | Shan ..................... G06F 21/79 |
| 2020/0293467 A1* | 9/2020 | Ma ...................... G06F 13/4291 |
| 2021/0397570 A1* | 12/2021 | Ware ................... G06F 13/1689 |

* cited by examiner

*Primary Examiner* — Eric Cardwell
(74) *Attorney, Agent, or Firm* — Jun He Law Offices P.C; James J. Zhu

(57) ABSTRACT

The application discloses a memory controller coupled between a memory module and a host controller to control access of the host controller to the memory module, the memory controller comprising: a central buffer coupled to the host controller via a command/address bus to receive a command/address signal from the host controller, wherein the central buffer is configured to determine whether the command/address signal conforms to an authority management rule and configure a buffer control command based on the determination result, so that the buffer control command indicates whether to restrict access of the host controller to the memory module; and a data buffer coupled via a data buffer command channel to the central buffer to receive the buffer control command, wherein the data buffer is configured to selectively restrict access of the host controller to the memory module based on the buffer control command; wherein the buffer control command comprises a plurality of time-sequenced fields, and the central buffer is configured to configure a second field or a field after the second field of the plurality of time-sequenced fields in the buffer control command based on the determination result.

23 Claims, 5 Drawing Sheets

MEMORY CONTROLLER AND METHOD FOR CONTROLLING ACCESS TO A MEMORY MODULE

FIELD OF THE INVENTION

The present application generally relates to the field of memory technology, and more specifically, to a memory controller and a method for controlling access to a memory module.

BACKGROUND OF THE INVENTION

In a computer system, the memory module is usually mainly used for providing storage of required data during operation of the host controller or the central processing unit ("CPU"). In some cases, for data security considerations, a data access authority management rule is configured in the computer system, and the access of the host controller to the memory module is restricted or allowed accordingly.

The memory system may include a memory controller that controls access of the host controller to the memory module. In order to control the access of the host controller to the memory module, the memory controller can determine whether a received command/address (C/A) signal conforms to a predetermined authority management rule, and based on the determination result, selectively block the C/A signal that does not conform to the authority management rule, convert the C/A signal that does not conform to the authority management rule into an invalid signal, or redirect the C/A signal that does not conform to the authority management rule to other memory addresses.

Such memory controller can prevent C/A signals that do not conform to the authority management rule from illegally reading data from the memory module or illegally writing data to the memory module, thereby effectively improving data security. However, the determination with the above-mentioned authority management rule increases the processing time of the memory controller, may cause errors in the error checking and correction (ECC) function of the host controller, and may cause unexpected operations. Therefore, it is necessary to improve the existing computer system.

SUMMARY OF THE INVENTION

An object of the present application is to provide a memory controller and a method for controlling access of a host controller to a memory module, so as to improve the control of an access command signal.

In one aspect, the present application provides a memory controller coupled between a memory module and a host controller to control access of the host controller to the memory module. The memory controller comprises: a central buffer coupled to the host controller via a command/address bus to receive a command/address signal from the host controller, wherein the central buffer is configured to determine whether the command/address signal conforms to an authority management rule and configure a buffer control command based on the determination result, so that the buffer control command indicates whether to restrict access of the host controller to the memory module; and a data buffer coupled via a data buffer command channel to the central buffer to receive the buffer control command, wherein the data buffer is configured to selectively restrict access of the host controller to the memory module based on the buffer control command; wherein the buffer control command includes a plurality of time-sequenced fields, and the central buffer is configured to configure a second field or a field after the second field of the plurality of time-sequenced fields in the buffer control command based on the determination result.

In some embodiments, the central buffer is configured to configure a last field in the buffer control command based on the determination result.

In some embodiments, the data buffer includes: a data bypass module configured to store dummy data; a buffer control module configured to, in response to that the command/address signal includes a reading command and the command/address signal does not conform to the authority management rule, control to transmit the dummy data to the host controller. In some of these implementations, the data bypass module includes a dummy data generation module configured to generate the dummy data. In one embodiment, the dummy data generation module is configured to receive a random seed from the central buffer and generate the dummy data based on the random seed. In some such embodiments, the data bypass module is configured to receive the dummy data from the central buffer.

In some embodiments, the central buffer includes a main signal path configured to receive the command/address signal from the host controller and provide the command/address signal to the memory module; an auxiliary signal path coupled to the main signal path to receive the command/address signal, the auxiliary signal path including a verification module configured to determine whether the command/address signal conforms to the authority management rule and configure the buffer control command based on the determination result. In some such embodiments, the verification module is coupled to the data buffer via the data buffer command channel, so as to send the buffer control command to the data buffer. In some such embodiments, the verification module includes: an identification module coupled to the main signal path to receive the command/address signal, wherein the identification module is configured to identify an access command, an access address, and/or identity source information included in the command/address signal; a management module coupled to the identification module to receive the access command, the access address and/or the identity source information included in the command/address signal, wherein the management module is configured to determine whether the command/address signal conforms to the authority management rule based on the access command, the access address and/or the identity source information, and configure the buffer control command based on the determination result; and a rule module storing the authority management rule, wherein the rule module is coupled to the management module to provide the authority management rule to the management module. In some of these embodiments, the verification module further includes a configuration module coupled to the rule module, wherein the authority management rule can be configured in advance or dynamically via the configuration module.

In some embodiments, the data buffer includes: a data bypass module; a buffer control module, wherein the buffer control module is configured to, in response to that the command/address signal includes a writing command and the command/address signal does not conform to the authority management rule, control to transmit data to be written corresponding to the command/address signal to the data bypass module.

In some embodiments, the data buffer includes: a data bypass module configured to store data read from the memory module; a buffer control module, wherein the buffer control module is configured to, in response to that the command/address signal includes a writing command and the command/address signal does not conform to the authority management rule, control to transmit the data stored in the data bypass module to the memory module. In some such implementations, the data corresponds to a first address in the memory module, and the buffer control module is configured to, in response to that the command/address signal includes a writing command and the command/address signal does not conform to the authority management rule, and the command/address signal includes an address message corresponding to the first address, control to transmit the data to the first address of the memory module.

In another aspect of the present application, a memory system is also provided, which includes the memory controller and memory module of the above-mentioned aspects; and a computer system is also provided, which includes the memory of the above-mentioned aspects.

In yet another aspect of the present application, a method for controlling access of a host controller to a memory module is also provided, the method comprising: receiving, by a central buffer, a command/address signal from the host controller; determining, by the central buffer, whether the command/address signal conforms to an authority management rule, and configuring, by the central buffer, a buffer control command based on the determination result, so that the buffer control command indicates whether to restrict access of the host controller to the memory module; and selectively restricting, by a data buffer, access of the host controller to the memory module based on the buffer control command; wherein the buffer control command includes a plurality of time-sequenced fields, and the central buffer configures a second field or a field after the second field of the plurality of time-sequenced fields in the buffer control command based on the determination result.

According to the technical solution of the present application, after receiving the C/A signal, a time period can be reserved for the central buffer to determine whether the C/A signal conforms to the authority management rule, so there is no need to additionally add time for the central buffer to process the C/A signal in the system. In addition, for the C/A signal that does not conform to the authority management rule, the technical solution of the present application can still send data or send an indication of successful writing to the host controller, which can avoid causing ECC error of the system. In addition, based on the received data or the indication of successful writing, an attacker who sends a C/A signal that does not conform to the authority management rule will mistakenly believe that illegal data has been written to the corresponding address in the memory module or that the real data in the memory module has been obtained, therefore, the technical solution of the present application can also confuse the attacker.

The foregoing is the summary of the present application, which can be simplified, summarized, and details omitted. Therefore, those skilled in the art should recognize that this part is merely an illustrative example and is not intended to limit the scope of the application in any way. This summary is neither intended to identify the key or essential characteristics of the subject matter sought to be protected nor is it intended to be an adjunct to determining the scope of the subject matter sought to be protected.

BRIEF DESCRIPTION OF THE FIGURES

The foregoing and other features of the present application will be more fully understood from the following description and the appended claims taken in conjunction with the accompanying drawings. It is to be understood that these accompanying drawings merely illustrate certain embodiments in accordance with the present application and should not be considered as limiting the scope of the present application. The present application will be illustrated more clearly and in more detail with the accompanying drawings.

DETAILED DESCRIPTION OF THE INVENTION

The following detailed description refers to the accompanying drawings as a part of the present disclosure. In the figures, similar symbols generally represent similar components unless otherwise stated in the context. The illustrative embodiments described in the detailed description, the accompanying drawings and the claims are not limiting. Other embodiments may be adopted, or modifications may be made without deviation from the spirit and the subject of the disclosure. It can be understood that, the various aspects of the disclosure described and graphically presented herein may be arranged, replaced, combined, divided and designed in many different configurations, and these different configurations are implicitly included in the disclosure.

The inventor of the present application found that, for the existing memory system, when processing a received C/A signal, the central buffer needs to wait for the determination result of whether the C/A signal conforms to the authority management rule before deciding how to process the C/A signal. Limited by factors such as computing power, the complexity of the authority management rule, and the manufacturing process of the chip, the determination of whether the C/A signal conforms to the authority management rule may not be completed within the time period originally set for the central buffer to process the C/A signal. Therefore, it may be needed to increase the time for the central buffer to process the C/A signal. This means that the settings of the entire system need to be adjusted and may affect the data reading and writing performance of the memory system.

In addition, for the existing memory system, in some cases, the memory controller will block the C/A signal that does not conform to the authority management rule or convert it into an invalid signal, therefore, after sending a C/A signal, the host controller may receive no reading date or receive no indication of successfully writing data, which may cause errors of the error checking and correction (ECC) function of the host controller. In addition, in some cases, in order to meet the ECC requirements, for a C/A signal that does not conform to the authority management rule, the memory controller may instead regenerate a new C/A signal, but due to the limited number of address bits, the new C/A signal may be directed to other protected data segments, thereby resulting in unexpected operation.

Figure 1:
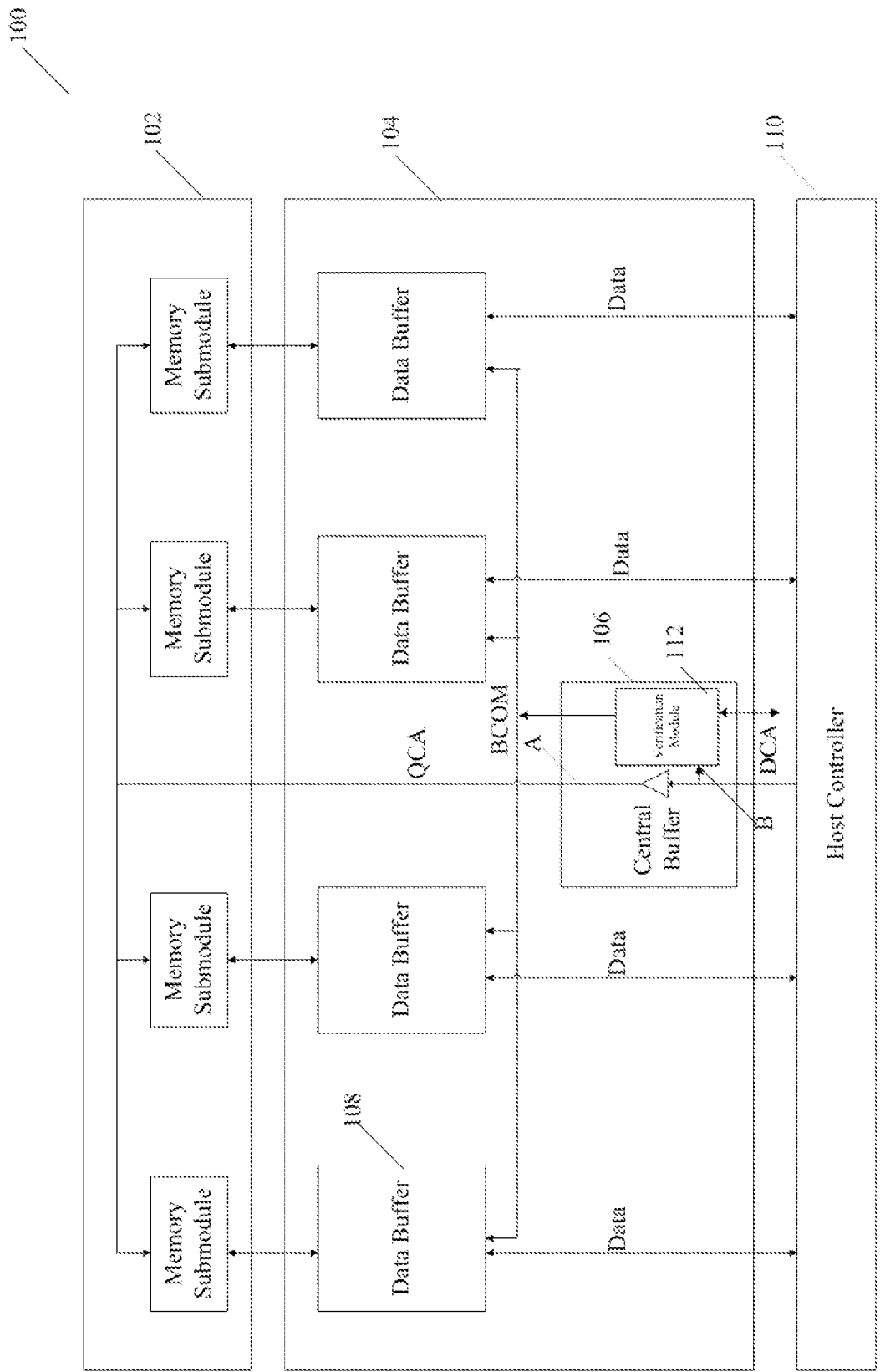
FIG. 1 illustrates a memory system according to an embodiment of the present application.

An embodiment of the present application discloses a memory controller, which can be applied to the memory system 100 shown in FIG. 1. The memory controller of the present application will be described below in detail by taking such memory system as an example.

As illustrated in FIG. 1, the memory system 100 comprises a memory module 102, which is constructed as a memory module group, for storing data. In some embodiments, the memory module 102 may be a memory module in accordance with the JEDEC Double Data Rate Synchronous Dynamic Random Access Memory (SDRAM) standards including, for example, the JEDEC DDR, DDR2, DDR3, DDR4, DDR5 and other DDR standards. Moreover, the memory module 102 may also be an internal memory module in accordance with other standards or protocols (e.g. the RAMBUS internal memory) and may also be a memory module in accordance with future memory standards or protocols. In some embodiments, the memory module 102 may include a volatile memory (e.g., DRAM), a non-volatile memory (e.g., flash memory, such as NAND or NOR flash memory) or a combination thereof. In other embodiments, the memory module 102 may also be a new type of memory module manufactured through other manufacturing processes, including but not limited to: magneto-resistive memory, phase change memory, resistive memory, semi-floating gate memory, or any other type of memories. It should be noted that the memory system in FIG. 1 is merely an example. In other embodiments, the memory module may comprise only one memory bank or each memory bank may comprise more than two memory blocks, and the number of memory blocks in each memory bank may be the same or different from each other. Moreover, it should be noted that the memory module 102 described herein may be a memory die, or may include two or more memory dies.

Moreover, the structure of the memory array or memory dies included in the memory module 102 may be any appropriate interconnection structures. For example, a plurality of memory dies may form a memory module in parallel; alternatively, a plurality of memory dies may use a multi-level interconnection structure (e.g., two levels). For example, one or more memory dies are used for the first level storage, and the other one or more memory dies are used for the second level storage, so as to provide different levels of storage. The second storage level which is the lower level can exchange data with exterior of the memory module through the first storage level.

As illustrated in FIG. 1, the memory system 100 further includes a memory controller 104 which includes a central buffer (RCD) 106. Specifically, the central buffer 106 is coupled between a host controller 110 and the memory module 102, and can receive a command/address (C/A) signal which includes an access command and an access address from the host controller 110. For example, the C/A signal may include a data storage address (i.e., the access address) in the memory module 102 and a command for accessing to (e.g., reading data from or writing data into) such access address. Further, the central buffer 106 can provide the received C/A signal to the memory module 102 and the memory module 102 can thus perform a corresponding data accessing operation according to the C/A signal. For the memory system in accordance with the DDR3, DDR4 or DDR5 standard, the central buffer 106 may be integrated into a registering clock driver (RCD). Accordingly, the central buffer 106 is coupled between the host controller 110 and the memory module 102 via a C/A bus, so as to receive the C/A signal from the host controller 110 and provide the received C/A signal to the memory module 102. Taking the DDR4 standard memory system as an example, for the memory system in accordance with the DDR4 standard, the C/A bus may include pins A0-A17, pins BG0-BG1 and/or pins BA0-BA1. Therein, the pins BG0-BG1 are used to determine which memory bank group in the memory module 102 is to be accessed, e.g. being written into or being read from; the pins BA0-BA1 are used to determine which memory bank in the memory module is to be accessed; and the pins A0-A17 are used for addressing and determining which memory block in the memory bank is to be accessed. Moreover, inputs to the four pins A16 (RAS_n), A15 (CAS_n), A14 (WE_n) and ACT_n are used for determining the input data access command, such as a reading command, a writing command or other predefined control commands.

The central buffer 106 comprises a main signal path A coupled between the receiving side (DCA side) and the output side (QCA side) of the C/A bus and an auxiliary signal path B coupled to the main signal path A. On the main signal path A, the central buffer 106 is configured to transfer the C/A signal to the memory module 102. A verification module 112 is coupled to the auxiliary signal path B, and is used for determining whether each C/A signal conforms to an authority management rule and configuring a buffer control command based on the determination result (described in detail below).

In some embodiments, the verification module 112 can determine whether each C/A signal conforms to the authority management rule according to identity source information of each C/A signal. For example, for C/A signals sent by the host controller 110, they all have corresponding identity source, that is, a signal or a command sent by a specific process or program according to practical needs of data processing. In one embodiment, the computer system can execute multiple processes, such as Process 1, Process 2, Process 3 . . . Process n, and a C/A signal can be sent by a specific process (for example, Process 3) to write data into or read data from a specific memory address. In another embodiment, for a computer system, it can execute processes or programs related to multiple users, such as User 1, User 2, User 3 . . . User n, and a C/A signal can be a signal sent by a process or program logged in by a specific user (for example, User 3), that is, the source of the C/A signal is the process or program related to such specific user. Accordingly, the host controller 110 sends a C/A signal along with identity authentication information identifying the source of each C/A signal. In one embodiment, the host controller 110 can send a C/A signal along with identity authentication information identifying the process source of a C/A signal, such as a process ID (for example, PID). In another embodiment, the host controller 110 can send a C/A signal along with identity authentication information identifying the user source of a C/A signal, such as the ID of the user. In yet another embodiment, the C/A signal can also have other types of sources. For example, C/A signals can be sent from different CPU cores (such as multiple CPU cores included in a multi-core CPU), and the host controller 110 can send a C/A signal along with identity authentication information identifying the CPU core source of the C/A signal. It can be understood that one or more types of the identity authentication information mentioned above can be sent together with the C/A signal.

The verification module 112 is coupled to the main signal path A of the C/A signals via the auxiliary signal path B of the central buffer 106 to receive C/A signals and identity authentication information for identifying the source of each C/A signal (such as a process source, a user source, etc.) transmitted on the C/A bus. The verification module 112 can snoop on the C/A signals transmitted on the C/A bus in real time, that is, it can extract the access command, the access address and the corresponding identity authentication information included in a C/A signal. In addition, the verification module 112 can store an authority management rule(s) or receive an authority management rule(s) from the outside. In some embodiments, the authority management rule may include access command types and/or access address ranges in the memory module 102 allowed for identity authentication information. The verification module 112 can compare the identity authentication information corresponding to each C/A signal as well as the access command and/or access address included in each C/A signal with the authority management rule to determine whether each C/A signal conforms to the authority management rule.

For example, in some embodiments where memory system 100 is configured to manage each C/A signal according to the process source of the C/A signal, the host controller 110 sends a C/A signal along with process identity authentication information corresponding to the C/A signal, such as the process ID. For example, the memory system 100 may comprise three processes: Process 1, Process 2 and Process 3, the host controller 110 sends a C/A signal along with a process ID identifying the process source of the C/A signal. In such an embodiment, the authority management rule stored in the verification module 112 or received from the outside includes both the access command type(s) and the access address range(s) allowed for each process ID. The verification module 112 will compare the access command and access address included in the C/A signal from a specific process with the authority management rule. For example, Table 1 lists several possible situations in which the verification module 112 compares the access command and access address included in the C/A signal with authority management rule based on the process source information of the C/A signal, according to an embodiment. Referring to Table 1, regarding C/A signals of Process 1, if the access command included in a C/A signal from Process 1 is a writing command and the access address falls within the address range of "the first memory block to the third memory block of the first memory sub-module", then such C/A signal is determined as conforming to the authority management rule; otherwise, if the access command included in a C/A signal from Process 1 is not a writing command, then such C/A signal is determined as not conforming to the authority management rule; or referring to Table 1, regarding C/A signals of Process 2, if the access address included in a C/A signal from Process 2 does not fall within the address range of "the first memory block to the fifth memory block of the third memory sub-module", then the verification module 112 determines that such C/A signal does not conform to the authority management rule. Similarly, the authority management rule may include no content for a certain process, and the memory system 100 can be configured that if no authority management rule is established for a certain process, such process is allowed to perform any access to any memory address or such process is not allowed to perform any access to any memory address. In this embodiment, no authority management rule is established for Process 3, which means that Process 3 is not allowed to perform any access to any memory address.

TABLE 1

Comparing C/A signal with authority management rule based on process source information of C/A signal

| | C/A Signal | Authority Management Rule | Determination Result |
|---|---|---|---|
| Process 1 | Perform a writing operation on the second memory block of the first memory sub-module | Process 1 is allowed to perform a writing operation to the first memory block to the third memory block of the first memory sub-module | Conform |
| | Perform a reading operation on the third memory block of the first memory sub-module | | Not Conform |
| Process 2 | Perform a reading operation on the fourth memory block of the second memory sub-module | Process 2 is allowed to perform a reading operation to the first memory block to the fifth memory block of the third memory sub-module | Not Conform |
| | Perform a reading operation on the first memory block of the third memory sub-module | | Conform |
| Process 3 | Perform a reading operation on the fourth memory block of the fourth memory sub-module | None | Not Conform |
| | Perform a reading operation on the fourth memory block of the second memory sub-module | | Not Conform |

Those skilled in the art can understand that, in other embodiments, the memory system 100 can also be configured to manage C/A signals based on other types of identity sources of each C/A signal. For example, the C/A signals may be managed based on the user source of each C/A signal, and the C/A signals may be managed based on different CPU cores that send each C/A signal, which is not limited in this application. In addition, those skilled in the art can also understand that the authority management rules stored in the verification module 112 or received from the outside may include only the access command types or only the access address ranges allowed for each identity source, and the verification module 112, correspondingly, only determines whether the command type included in each C/A signal is consistent with the command type allowed for the corresponding identity source included in the authority management rule, or determines whether the access address included in each C/A signal falls within the access address range allowed for the corresponding identity source included in the authority management rule, which is not limited by the present application.

In addition, those skilled in the art can understand that the memory system 100 can also manage each C/A signal only based on the identity source of the C/A signal, regardless of the access command type and the access address included in the C/A signal. For example, in one embodiment, the memory system 100 may be configured to allow all C/A signals from Process 1 and Process 3 to make any accesses to any addresses, but not to allow any C/A signal from Process 2 to make any access. In such an embodiment, when a C/A signal is received, the verification module 112 may identify only the identity source information corresponding to the C/A signal, without identifying and determining the access command type or the access address included in the C/A signal. For example, if the verification module 112 identifies that a C/A signal comes from Process 1 or Process 3, the verification module 112 directly determines that it conforms to the authority management rule; if the verification module 112 identifies that a C/A signal comes from Process 2, the verification module 112 directly determines that it does not conform to the authority management rule.

Figure 2:
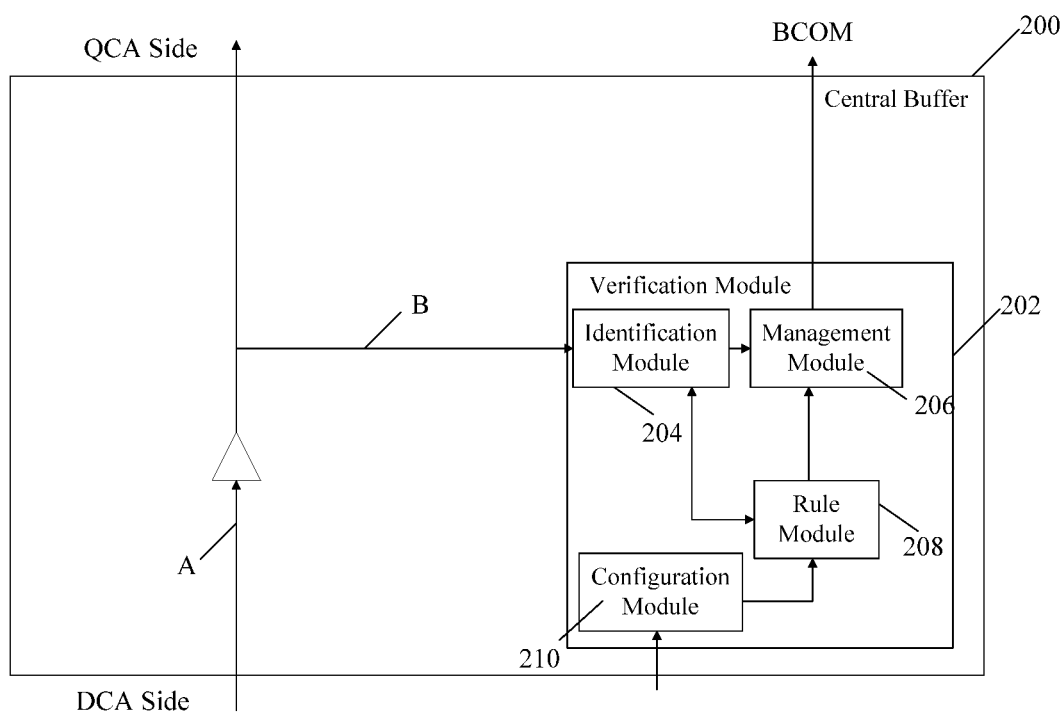
FIG. 2 illustrates a central buffer according to an embodiment of the present application.

FIG. 2 shows an exemplary structure of a central buffer 200 according to an embodiment, which may be applied to various memory systems, such as the memory system 100 shown in FIG. 1. As shown in FIG. 2, the central buffer 200 includes a verification module 202 which further includes an identification module 204, a management module 206, a rule module 208. In some embodiments, the central module 204 may also include an configuration module 210.

The identification module 204 is coupled to the main signal path A of the C/A bus to receive C/A signals transmitted on the C/A bus. The identification module 204 can snoop on the C/A signals transmitted on the C/A bus in real time, that is, it can extract the access command and/or the access address included in the C/A signal. In some embodiments, the identification module 204 can selectively extract the access command and/or the access address included in the C/A signal according to the authority management rule used by the management module 206. For example, when the authority management rule used by the management module 206 includes only the access command type allowed for identity authentication information, the identification module 204 can extract only the access command but not the access address; when the authority management rule used by the management module 206 includes both the access command type allowed for identity authentication information and the access address range allowed for identity authentication information, the identification module 204 may extract both the access command and access address in the C/A signal. Further, the identification module 204 may also be configured to extract both the access command and access address in the C/A signal, but selectively send the extracted access command and/or access address to the management module 206 according to the authority management rule used by the management module 206 to determine whether it conforms to the authority management rule, which is not limited by the present application.

In some embodiments, the identification module 204 can extract the access address and/or access command included in each C/A signal and send in real time the access address and/or access command extracted from each C/A signal to the management module 206. In other words, the identification module 204 can immediately send the extracted access command and/or access address to the management module 206 after snooping on each C/A signal.

In some embodiments, the identification module 204 also receives the identity authentication information corresponding to each C/A signal from the host controller and sends the identity authentication information to the management module 206 for subsequent determination. In some embodiments, the identity authentication information corresponding to each C/A signal sent by the host controller is the ID of a certain process (for example, PID). In such an embodiment, the identification module 204 can identify the ID in the signal sent by the host controller, and send the ID to the management module 206 for subsequent determination. Similarly, for other types of sources of C/A signals (such as user source, host controller core source), the identification module 204 can also identify the corresponding identity authentication information from the signal sent by the host controller, and send the identity authentication information to the management module 206 for subsequent determination.

The management module 206 is coupled to the identification module 204 to receive access commands and/or access addresses as well as the corresponding identity authentication information sent from the identification module 204, and is also coupled to the rule module 208 to receive the authority management rule stored therein. The management module 206 can compare with the authority management rule based on the received access command and/or access address as well as the corresponding identity authentication information to determine whether each C/A signal conforms to the authority management rule, for example, as described above in conjunction with Table 1. After generating the determination result, the management module 206 configures a buffer control command based on the determination result, and sends the buffer control command to the data buffer via Data Buffer Command (BCOM) channel, which is described below.

The rule module 208 may include a non-volatile storage element, which stores the authority management rule required by the management module 206 for determination. The rule module 208 is coupled to the management module 206 to provide the authority management rule. Optionally, the rule module 208 can also be coupled to the identification module 204, so that the identification module 204 can selectively snoop on each C/A signal according to the current authority management rule (for example, as described above, selectively extract either the access command or the access address included in the C/A signal, or extract both the access command and access address). Optionally, the identification module 204 may also send the extracted access command and/or access address and the corresponding identity authentication information to the rule module 208, so that the rule module 208 can select an appropriate set of authority management rules from multiple sets of authority management rules stored therein and provide the selected authority management rules to the management module 206.

In some embodiments, the authority management rules can be stored in advance directly in the rule module 208 (for example, directly stored in the rule module 208 by the initial user before the entire memory system starts operation), and thus the configuration module 210 may not be included.

In some embodiments, the configuration module 210 coupled to the rule module 208 can be provided, so that the authority management rule stored in the rule module 208 can be configured in advance or dynamically through the configuration module 210. In an embodiment, the authority management rule stored in the rule module 210 can be pre-configured, that is, before the operation of the entire memory system (such as the memory system 100 as illustrated in FIG. 1), the authority management rule of the rule module 208 is configured via the configuration module 210. In another embodiment, the authority management rule of the rule module 210 can be dynamically configured, that is, the authority management rule of the rule module 208 is dynamically configured according to the operating conditions during the operation of the entire memory system (such as the memory system 100 as illustrated in FIG. 1) via the configuration module 210.

In some embodiments, the configuration module 210 can be coupled to the host controller (for example, the host controller 110 as illustrated in FIG. 1), so that the user can send configuration data to the configuration module 210 via the host controller to configure the authority management rule. In some embodiments, the configuration module 210 can be coupled to an external controller (not shown in FIG. 2; the external controller may include, for example, computer, mobile phone, tablet, or etc. of the user, which is not limited by the present application), and the configuration data can be transmitted to the configuration module 210 via the external controller to configure the authority management rule.

In some embodiments, the configuration module 210 can store multiple sets of configuration data for configuring the authority management rule of the rule module 208, and the configuration module 210 can be coupled to the host controller (for example, the host controller 110 as illustrated in FIG. 1) or an external controller as described above to receive a configuration instruction. The configuration instruction can select one set of predetermined configuration data from the multiple stored sets of predetermined configuration data to configure the authority management rule of the rule module 208.

In some embodiments, the configuration module 210 can automatically configure the authority management rule of the rule module 208. In an embodiment, the configuration module 210 can store multiple sets of predetermined configuration data used for configuring the authority management rule of the rule module 208, and the configuration module 210 can also store different application conditions for multiple sets of predetermined configuration data. During the operation of the memory system (for example, the memory system 100 as illustrated in FIG. 1), the configuration module 210 can automatically apply different predetermined configuration data when different conditions are satisfied, so as to automatically and dynamically configure the authority management rule. For example, the configuration module 210 may include three sets of predetermined configuration data for Process 1, wherein the predetermined configuration data A does not limit any C/A signal from Process 1, the predetermined configuration data B forbids writing commands from Process 1, and the predetermined configuration data C forbids both the writing commands and reading commands from Process 1. The configuration module 210 may apply the predetermined configuration data A at the beginning. When the frequency or times that Process 1 accesses the memory module exceeds a certain threshold (for example, accesses five times in one minute), the (for example, stricter) predetermined configuration data B is applied. After the times or frequency that the C/A signals from Process 1 do not match the predetermined configuration data B exceeds a predetermined threshold, the (for example, the strictest) predetermined configuration data C is applied. In other words, the configuration module 210 can adjust the configuration data applied to the processes according to the historical access condition of the C/A signals from different processes.

Referring back to FIG. 1, after determining whether the C/A signal conforms to the authority management rule, the central buffer 106 configures a buffer control command according to the determination result. Specifically, the buffer control command can be configured by the management module in the central buffer (for example, the management module 206 described in conjunction with FIG. 2) according to the determination result.

Figure 3:
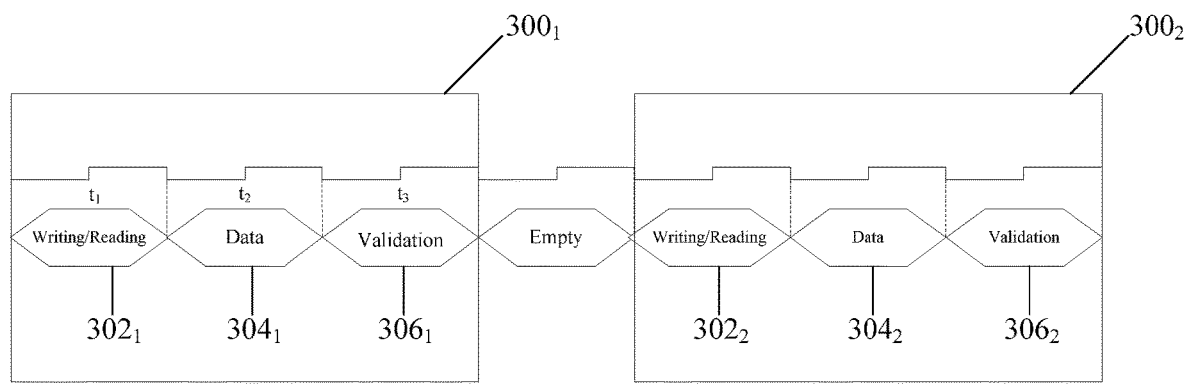
FIG. 3 illustrates a buffer control command according to an embodiment of the present application.

FIG. 3 shows two buffer control commands $300_1$ and $300_2$ sent through the BCOM channel, which correspond to two C/A signals received by the central buffer, for example, the buffer control command $300_1$ corresponds to a first C/A signal received at a first time point, and the buffer control command $300_2$ corresponds to a second C/A signal received at a second time point after the first time point. As shown in FIG. 3, each buffer control command has multiple fields, such as a writing/reading field 302, a data field 304, a validation field 306 and any other fields that can be configured according to practical needs, wherein the writing/reading field 302 is for indicating whether the C/A signal includes a reading command or a writing command, the data field 304 is for transmitting necessary data, and the validation field 306 is for validation purpose. These fields are time-sequenced fields. For example, as shown in FIG. 3, for the buffer control command $300_1$, the writing/reading field $302_1$ is sent in a first time period $t_1$, the data field $304_1$ is sent in a second time period $t_2$, and the validation field $306_1$ is sent in a third time period $t_3$. For more information about the fields of the buffer control command, it can be referred to the relevant definitions in memory standards such as DDR3, DDR4, or DDR5.

It can be seen that the use of the BCOM channel to send the buffer control command containing the determination result not only utilizes the redundant or reserved message transmission capability in the BCOM channel, but also avoids modifying the hardware structure of the memory system, thereby improving the compatibility of the authority management mechanism of the present application.

After receiving a C/A signal, a central buffer (for example, the central buffer 200 shown in FIG. 2) sends a buffer control command to the data buffer (for example, the data buffer 400 shown in FIG. 4 below) through the BCOM channel, and the data buffer will control the data interaction between the memory module (for example, the memory module 102 shown in FIG. 1) and the host controller (for example, the host controller 110 shown in FIG. 1) according to the buffer control command. For example, the central buffer may configure the writing/reading field 302 according to the command type included in the C/A signal, indicating the data buffer to send data in the memory module to the host controller (for example, the command included in the corresponding C/A signal is a reading command) or instructs the data buffer to send data from the host controller to the memory module (for example, the command included in the corresponding C/A signal is a writing command).

According to an embodiment of the present application, when the central buffer determines that the C/A signal does not conform to the authority management rule, the central buffer may configure a buffer control command accordingly, so that the buffer control command instructs the data buffer to restrict the memory module access. In some embodiments, a field in the buffer control command may be configured to reserve one bit of data, and the reserved one bit of data may be configured to have different values according to the determination result of whether the C/A signal conforms to the authority management rule. For example, when the central buffer determines that the corresponding C/A signal conforms to the authority management rule, the reserved one bit of data may be configured to have a value of "0"; when the central buffer determines that the corresponding C/A signal does not conform to the authority management rule, the reserved bit of data may be configured to have a value of "1".

In one embodiment, the central buffer is configured to, according to the determination result of whether the C/A signal conforms to the authority management rule, configure a second field or a field after the second field in the buffer control command corresponding to the C/A signal. For example, in FIG. 3, for the buffer control command $300_1$, the central buffer is configured to configure the data field $304_1$ or the validation field $306_1$ based on whether the corresponding C/A signal conforms to the authority management rule; for the buffer control command $300_2$, the central buffer is configured to configure the data field $304_2$ or the validation field $306_2$ based on whether the corresponding C/A signal conforms to the authority management rule. The advantage of this is that a time period can be reserved for the central buffer to determine whether the C/A signal conforms to the authority management rule. For example, for the buffer control command $300_1$ shown in FIG. 3, after receiving the corresponding C/A signal, the central buffer can determine, during the first time period $t_1$ when the writing/reading field $302_1$ is sent, whether the corresponding C/A signal conforms to the authority management rule, and configure the data field $304_1$ sent in the second time period $t_2$ or the validation field $306_1$ sent in the third time period $t_3$, accordingly. In one embodiment, the central buffer is configured to configure a last field in the buffer control command based on whether the C/A signal conforms to the authority management rule. For example, for the buffer control command $300_1$ shown in FIG. 3, the central buffer is configured to, based on whether the C/A signal conforms to the authority management rule, configure the validation field $306_1$, so that the central buffer can utilize the first time period $t_1$ for sending the writing/reading field $302_1$ and the second time period $t_2$ for sending the data field $304_1$ to determine whether the C/A signal conforms to the authority management rule, so as to maximally reserve time for the central buffer for determining whether the corresponding C/A signal conforms to the authority management rule.

According to another embodiment of the present application, when the central buffer determines that the C/A signal does not conform to the authority management rule, the central buffer can also modify the fields in the buffer control command accordingly, so that the data buffer cannot parse the modified buffer control command. Therefore, the data buffer cannot perform subsequent operations, thereby the data in the memory can be protected from malicious reading or the memory can be protected from being maliciously written with data. For example, in FIG. 3, in one such embodiment, after determining that the C/A signal corresponding to the buffer control command $300_1$ does not conform to the authority management rule, the central buffer is configured to modify the field(s) in the buffer control command $300_1$ to all 0 or all 1, for example, to modify the data field $304_1$ and/or the validation field $306_1$ to all 0 or all 1. The modified buffer control command $300_1$ cannot be parsed by the data buffer, so the data buffer cannot perform subsequent operations, thereby the data in the memory can be protected from malicious reading or the memory can be protected from being maliciously written with data. Similar to the embodiments discussed above, after determining that a C/A signal does not conform to the authority management rule, the central buffer can be configured to modify a second field or a field after the second field in the buffer control command, so that a time period can be reserved for the central buffer to determine whether the C/A signal conforms to the authority management rule. In one embodiment, the central buffer is configured to modify a last field in the buffer control command based on whether the C/A signal conforms to the authority management rule, so as to maximally reserve time for the central buffer for determining whether the corresponding C/A signal conforms to the authority management rule.

Referring back to FIG. 1, the memory controller 104 further includes data buffers (DB) 108. The data buffers 108 are coupled between the memory module 102 and the host controller 110, and are used for exchanging data between the memory module 102 and the host controller 110. For example, via the data buffers 108, target data stored in the memory module 102 can be read out and sent to the host controller 110; or via the data buffers 108, the target data received from the host controller 110 may be written into corresponding memory block in the memory module 102. The data buffer 108 is coupled to the central buffer 106 through the BCOM channel to receive buffer control commands (for example, buffer control commands $300_1$ and $300_2$ shown in FIG. 3) from the central buffer 106, so as to control the data exchange between the memory module 102 and the host controller 110, which will be described below in details. The memory controller 104 may include one or more data buffers 108 (for example, in FIG. 1, four data buffers 108 are included), and each data buffer 108 is coupled to one or more corresponding memory sub-modules (for example, in FIG. 1, each data buffer 108 is coupled to one corresponding memory submodule). It can be appreciated that the present application does not limit the number of data buffers 108 (for example, including less than 4 data buffers or more than 4 data buffers, such as 8, 9 or 10 data buffers), nor does it limit the number of memory submodules that each data buffer 108 is coupled to.

Figure 4:
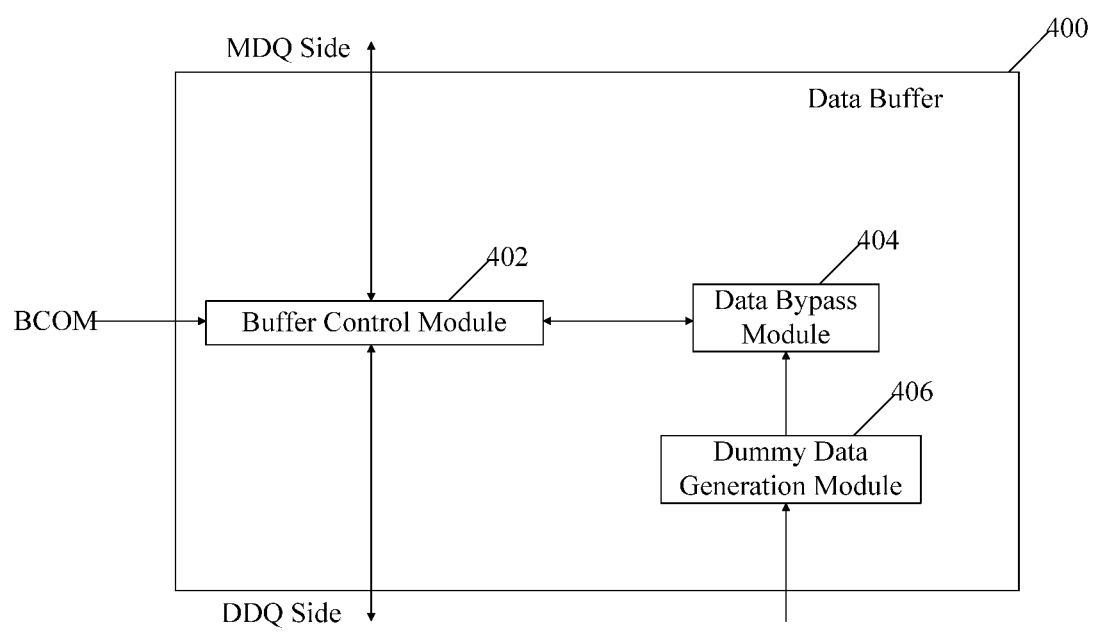
FIG. 4 illustrates a data buffer according to an embodiment of the present application.

FIG. 4 illustrates a data buffer 400 according to one embodiment, which may be used for, for example, the memory system 100 shown in FIG. 1. As shown in FIG. 4, the data buffer 400 includes a buffer control module 402 on the data buffer path DQ and coupled to the BCOM channel, and a data bypass module 404 coupled to the buffer control module 402.

The buffer control module 402 is coupled to the BCOM channel to receive buffer control commands (for example, the buffer control commands $300_1$ and $300_2$ shown in FIG. 3) from the central buffer (for example, the central buffer 106 shown in FIG. 1, the central buffer 200 shown in FIG. 2). The buffer control module 402 is configured to, according to the buffer control commands, selectively transmit data between the host controller and the memory module or transmit data between the host controller and the data bypass module 404, as described below.

The data bypass module 404 has a data storage function that is configured to store dummy data, store data to be written from the host controller, and/or store data read from the memory module. When the buffer control command received by the buffer control module 402 indicates that the C/A signal from the host controller conforms to the authority management rule, the data bypass module 404 may not operate, so that the buffer control module 402 may control, according to the access address in the C/A signal, to send the data of the corresponding address in the memory module to the host controller, or according to the access address in the C/A signal, to write the corresponding data to be written into the corresponding address in the memory module. Differently, when the buffer control command received by the buffer control module 402 indicates that the C/A signal from the host controller does not conform to the authority management rule, the buffer control module 402 may send the data stored in the data bypass module 404 (for example, the dummy data as described below) to the host controller or write the data from the host controller into the data bypass module 404.

In one embodiment, the data bypass module 404 stores dummy data, such as a set of dummy codes, a set of randomly generated codes, or any data that does not pose a threat to system security. When the buffer control command received by the buffer control module 402 indicates that the C/A signal from the host controller includes a reading command and the C/A signal does not conform to the authority management rule, the data buffer 400 no longer sends the data read from the memory module to the host controller, and instead, the data buffer 400 will send the dummy data stored in the data bypass module 404 to the host controller. In this way, even if the reading command does not conform to the authority management rule, the host controller can still obtain the returned data (that is, the dummy data stored in the data bypass module 404). Of course, the returned data is not valid data. In this way, the data in the memory module can be protected from being accessed by illegal programs, and ECC error of the host controller may not be caused. In addition, after an illegal program that sends a C/A signal not conforming to the authority management rules obtains dummy data, it may mistakenly believe that the data in the memory module has been obtained, thus preventing the illegal program from ceaselessly accessing the memory module after the access fails.

In some embodiments, dummy data can be stored in advance in the data bypass module 404 by the user before the entire system operates. In one embodiment, dummy data may be provided to the data bypass module 404 by other components of the memory system. For example, the central buffer may be configured to generate dummy data, and the data bypass module 404 may be coupled to the central buffer to receive the generated dummy data. In one embodiment, dummy data may be generated by the data buffer 400, for example, the data buffer 400 may optionally include a dummy data generation module 406, which may be configured to generate dummy data and send the dummy data to the data bypass module 404. The dummy data generation module 406 may be coupled to or included in the data bypass module 404. In one embodiment, the dummy data is random code data generated according to a random seed. The data buffer 400 may store the random seed in advance or receive the random seed from other components of the memory system. For example, the dummy data generation module 406 may receive the random seed from the central buffer.

In another embodiment, the data bypass module 404 can be configured to selectively store data to be written from the host controller. When the buffer control command received by the buffer control module 402 indicates that the C/A signal from the host controller includes a writing command and the C/A signal does not conform to the authority management rule, the data buffer 400 no longer writes the data to be written to the access address included in the corresponding C/A signal from the host controller to the memory module, and instead, the data to be written is written to the data bypass module 404. In this way, even if the sent writing signal does not conform to the authority management rule, the host controller can still obtain an indication of successfully writing data, which can not only protect the memory module from being written with illegal data, but also prevent causing ECC errors of the host controller. In addition, an attacker who sends a C/A signal that does not conform to the authority management rule may mistakenly believe that the illegal data has been written into the corresponding address in the memory module, therefore such an implementation can also confuse the attacker.

In yet another embodiment, when the memory system processes a reading command that conforms to the authority management rule, in addition to sending the corresponding data read from the memory module to the host controller, the data read from the memory module may also be stored in the data bypass module 404. In this way, when the buffer control command subsequently received by the buffer control module 402 indicates that the C/A signal from the host controller includes a writing command and the C/A signal does not conform to the authority management rule, the data buffer 400 no longer writes the data to be written from the host controller and corresponding to the C/A signal into the memory module, and instead, the data read from the memory module previously stored in the data bypass module 404 will be, again, written into the memory module. Therefore, the data in the memory module does not change at all. In this way, even if the writing command does not conform to the authority management rule, the host controller can still obtain an indication of successfully writing data, which can not only protect the memory module from being written with illegal data, but also prevent causing ECC errors of the host controller. In addition, an attacker who sends a C/A signal that does not conform to the authority management rule may mistakenly believe that the illegal data has been written into the corresponding address in the memory module, therefore such an implementation can also confuse the attacker. The data read from the memory module and stored in the data bypass module 404 may correspond to different addresses in the memory module. For example, a first data stored in the data bypass module 404 may correspond to a first address of the memory module, a second data stored in the data bypass module 404 may correspond to a second address of the memory module, a third data stored in the data bypass module 404 may correspond to a third address of the memory module, and so on. In this way, for a subsequently received C/A signal that includes a writing command and does not conform to the authority management rule, the buffer control module 402 will also, based on the address message included in the C/A signal, send the corresponding stored data to the corresponding address. For example, if the subsequently received C/A signal, including a writing command and not conforming to the authority management rule, includes an address message corresponding to the first address, the buffer control module 402 will send the stored data corresponding to the first address to the first address of the memory module.

Figure 5:
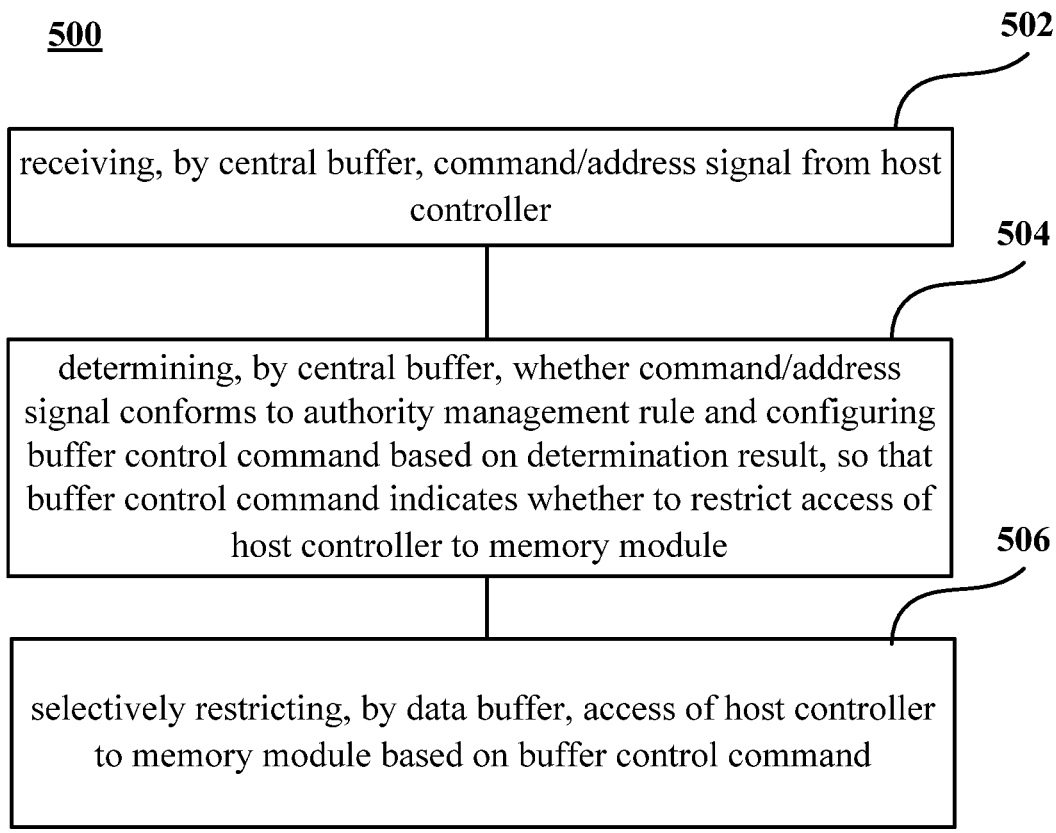
FIG. 5 illustrates a method for controlling access of a host controller to a memory module.

FIG. 5 illustrates a method 500 for controlling access of a host controller to a memory module according to an embodiment of the present application. The method 500 may be executed by, for example, the memory system 100 as illustrated in FIG. 1, the central buffer 200 as illustrated in FIG. 2, and the data buffers 400 as illustrated in FIG. 4.

As illustrated in FIG. 5, the method 500 may include Step 502: receiving, by a central buffer, a command/address signal from the host controller; Step 504: determining, by the central buffer, whether the command/address signal conforms to an authority management rule and configuring a buffer control command based on the determination result, so that the buffer control command indicates whether to restrict access of the host controller to the memory module; and Step 506: selectively restricting, by the data buffer, access of the host controller to the memory module based on the buffer control command.

In some embodiments, Step 502 may include: receiving, via a main signal path of the central buffer, the command/address signal from the host controller and sending the command/address signal transmitted on the main signal path to an auxiliary signal path of the central buffer. Step 504 may include determining, on the auxiliary signal path, whether the command/address signal conforms to the authority management rule and configuring the buffer control command based on the determination result. In some such embodiments, the method 500 further includes sending the buffer control command from the auxiliary signal path to the data buffer via a data buffer command channel.

In some embodiments, Step 504 may include: identifying an access command, an access address and/or identity source information in the command/address signal; receiving the authority management rule; and determining, based on the access command, the access address and/or the identity source information, whether the command/address signal conforms to the authority management rule and configuring the buffer control command based on the determination result. In some embodiments, the authority management rule can be configured in advance or dynamically configured.

In some embodiments, the buffer control command includes a plurality of fields, one of which may be configured to reserve one bit of data, and the reserved one bit of data may be configured to, based on the determination result of whether the C/A signal conforms to the authority management rule, have different values, so the buffer control command can indicate whether to restrict access of the host controller to the memory module based on the reserved one bit of data.

In some embodiments, the fields included in the buffer control command are time-sequenced fields, and the central buffer is configured to configure a second field or a field after the second field of the time-sequenced fields based on the determination result of whether the C/A signal conforms to the authority management rule, and preferably, configure the last field in the buffer control command, as described above.

In some embodiments, for Step 504, the command/address signal includes an identity authentication information, and the authority management rule includes the access command type allowed for identity authentication information and/or the access address range of the memory module allowed for identity authentication information, and the central buffer can determine accordingly whether each command/address conforms to the authority management rule, as described above.

In some embodiments, Step 506 further includes: in response to that the command/address signal includes a reading command and the command/address signal does not conform to the authority management rule, the data buffer transmits dummy data stored therein to the host controller. In one such embodiment, the method 500 may further include generating, by the data buffer, the dummy data and, optionally further include receiving, by the data buffer, a random seed from the central buffer and generating dummy data based on the random seed. In one such embodiment, the method 500 may further include receiving, by the data buffer, the dummy data from the central buffer.

In some embodiments, Step 506 further includes in response to that the command/address signal includes a writing command and the command/address signal does not conform to the authority management rule, transmitting, by the data buffer, data to be written corresponding to the command/address signal to the data buffer.

In some embodiments, Step 506 further includes storing, by the data buffer, data read from the memory module, and in response to that the command/address signal includes a writing command and the command/address signal does not conform to the authority management rule, controlling to transmit the data in the data buffer to the memory module. In some of these embodiments, the stored data corresponds to a first address in the memory module, and Step 506 further comprises in response to that the command/address signal includes a writing command and the command/address signal does not conform to the authority management rule, and the command/address signal includes an address message corresponding to the first address, controlling to transmit the stored data to the first address of the memory module.

It should be noted that although several steps of the method for accessing the memory module and several modules or sub-modules of in the memory controller are mentioned in the above detailed description, such division is exemplary and not mandatory. Practically, according to the embodiments of the present application, the features and functions of two or more modules described above can be embodied into one module. In contrast, the features and functions of a module described above can be further divided into multiple modules to be embodied. In addition, the order of the steps described in the present application is not mandatory, and the order of execution can be modified according to actual needs.

Those skilled in the art can understand and implement other variations to the disclosed embodiments from a study of the specification, the disclosure and accompanying drawings, and the appended claims. In the claims, the word "comprising" does not exclude other elements or steps, and the indefinite article "a" or "an" does not exclude a plurality. In applications according to present application, one element may conduct functions of several technical feature recited in claims. Any reference numerals of the drawings in the claims should not be construed as limiting the scope.

What is claimed is:

1. A memory controller coupled between a memory module and a host controller to control access of the host controller to the memory module, the memory controller comprising:
a central buffer coupled to the host controller via a command/address bus to receive a command/address signal from the host controller, wherein the central buffer is configured to determine whether the command/address signal conforms to an authority management rule and configure a buffer control command based on the determination result, so that the buffer control command indicates whether to restrict access of the host controller to the memory module; and
a data buffer coupled via a data buffer command channel to the central buffer to receive the buffer control command, wherein the data buffer is configured to selectively restrict access of the host controller to the memory module based on the buffer control command;
wherein the buffer control command comprises a plurality of time-sequenced fields, and the central buffer is configured to configure a second field or a field after the second field of the plurality of time-sequenced fields in the buffer control command based on the determination result.

2. The memory controller of claim 1, wherein the central buffer is configured to configure a last field in the buffer control command based on the determination result.

3. The memory controller of claim 1, wherein the data buffer comprises:
a data bypass module configured to store dummy data;
a buffer control module configured to, in response to that the command/address signal includes a reading command and the command/address signal does not conform to the authority management rule, control to transmit the dummy data to the host controller.

4. The memory controller of claim 3, wherein the data bypass module comprises a dummy data generation module configured to generate the dummy data.

5. The memory controller of claim 1, wherein the central buffer comprises:
  a main signal path configured to receive the command/address signal from the host controller and provide the command/address signal to the memory module; and
  an auxiliary signal path coupled to the main signal path to receive the command/address signal, wherein the auxiliary signal path includes a verification module configured to determine whether the command/address signal conforms to the authority management rule and configure the buffer control command based on the determination result.

6. The memory controller of claim 5, wherein the verification module is coupled to the data buffer via the data buffer command channel, to send the buffer control command to the data buffer.

7. The memory controller of claim 5, wherein the verification module comprises:
  an identification module coupled to the main signal path to receive the command/address signal, and the identification module is configured to identify an access command, an access address and/or identity source information included in the command/address signal;
  a management module coupled to the identification module to receive the access command, the access address and/or the identity source information included in the command/address signal, wherein the management module is configured to determine whether the command/address signal conforms to the authority management rule based on the access command, the access address and/or the identity source information and configure the buffer control command based on the determination result; and
  a rule module storing the authority management rule, wherein the rule module is coupled to the management module to provide the authority management rule to the management module.

8. The memory controller of claim 7, wherein the verification module further comprises a configuration module coupled to the rule module, wherein the authority management rule is configurable in advance or dynamically via the configuration module.

9. The memory controller of claim 1, wherein the data buffer comprises:
  a data bypass module; and
  a buffer control module, wherein the buffer control module is configured to, in response to that the command/address signal includes a writing command and the command/address signal does not conform to the authority management rule, control to transmit data to be written corresponding to the command/address signal to the data bypass module.

10. The memory controller of claim 1, wherein the data buffer comprises:
  a data bypass module configured to store data read from the memory module; and
  a buffer control module, wherein the buffer control module is configured to, in response to that the command/address signal includes a writing command and the command/address signal does not conform to the authority management rule, control to transmit the data stored in the data bypass module to the memory module.

11. The memory controller of claim 10, wherein the data corresponds to a first address in the memory module, and the buffer control module is configured to, in response to that the command/address signal includes a writing command and the command/address signal does not conform to the authority management rule, and the command/address signal includes an address message corresponding to the first address, control to transmit the data to the first address of the memory module.

12. A memory system, wherein the memory system comprises the memory controller and the memory module according to claim 1.

13. A method for controlling access of a host controller to a memory module, the method comprising:
  receiving, by a central buffer, a command/address signal from the host controller;
  determining, by the central buffer, whether the command/address signal conforms to an authority management rule and configuring a buffer control command based on the determination result, so that the buffer control command indicates whether to restrict access of the host controller to the memory module; and
  selectively restricting, by a data buffer, access of the host controller to the memory module based on the buffer control command;
  wherein the buffer control command includes a plurality of time-sequenced fields, and a second field or a field after the second field of the plurality of time-sequenced fields in the buffer control command is configured by the central buffer based on the determination result.

14. The method of claim 13, wherein a last field in the buffer control command is configured by the central buffer based on the determination result.

15. The method of claim 13, wherein the data buffer stores dummy data, and the method comprises:
  transmitting, by the data buffer, the dummy data to the host controller in response to that the command/address signal includes a reading command and the command/address signal does not conform to the authority management rule.

16. The method of claim 15, further comprising:
generating, by the data buffer, the dummy data.

17. The method for claim 13, further comprising:
  receiving, via a main signal path of the central buffer, the command/address signal from the host controller;
  sending the command/address signal transmitted on the main signal path to an auxiliary signal path of the central buffer; and
  determining on the auxiliary signal path whether the command/address signal conforms to the authority management rule, and configuring the buffer control command based on the determination result.

18. The method of claim 17, further comprising:
  sending the buffer control command from the auxiliary signal path to the data buffer through a data buffer command channel.

19. The method of claim 13, wherein determining, by the central buffer, whether the command/address signal conforms to the authority management rule further comprises:
  identifying an access command, an access address, and/or identity source information included in the command/address signal;
  receiving the authority management rule; and
  determining whether the command/address signal conforms to the authority management rule based on the access command, the access address and/or the identity source information and configuring the buffer control command based on the determination result.

20. The method of claim 13, wherein the authority management rule is configured in advance or dynamically.

21. The method of claim 13, further comprising:
transmitting, by the data buffer, data to be written corresponding to the command/address signal to the data bypass module in response to that the command/address signal includes a writing command and the command/address signal does not conform to the authority management rule.

22. The method of claim 13, further comprising:
storing, by the data buffer, data read from the memory module; and
transmitting, by the data buffer, the stored data to the memory module in response to that the command/address signal includes a writing command and the command/address signal does not conform to the authority management rule.

23. The method of claim 22, wherein the data corresponds to a first address in the memory module, and the method further comprises:
controlling to transmit the data to the first address of the memory module in response to that the command/address signal includes a writing command and the command/address signal does not conform to the authority management rule and in response to that the command/address signal includes an address message corresponding to the first address.

* * * * *